(12) United States Patent
Du et al.

(10) Patent No.: US 11,690,333 B2
(45) Date of Patent: Jul. 4, 2023

(54) SYSTEM AND METHOD FOR OPTIMAL ALLOCATION OF AGRICULTURAL WATER BASED ON WATER CONSUMPTION CONTROL

(71) Applicant: China Institute of Water Resources and Hydropower Research, Beijing (CN)

(72) Inventors: Lijuan Du, Beijing (CN); Baozhong Zhang, Beijing (CN); Bo Lei, Beijing (CN); Changshun Liu, Beijing (CN); Yanbin Li, Beijing (CN); Daoxi Li, Beijing (CN); Jihong Qu, Beijing (CN); Xiaodong Wang, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 143 days.

(21) Appl. No.: 17/334,809

(22) Filed: May 31, 2021

(65) Prior Publication Data

US 2021/0368701 A1 Dec. 2, 2021

(30) Foreign Application Priority Data

May 29, 2020 (CN) .......................... 202010473018.9

(51) Int. Cl.
*A01G 25/16* (2006.01)
*A01B 79/00* (2006.01)
*A01G 25/02* (2006.01)
(52) U.S. Cl.
CPC ............ *A01G 25/16* (2013.01); *A01B 79/005* (2013.01); *A01G 25/02* (2013.01)

(58) Field of Classification Search
CPC ...... A01G 25/16; A01G 25/02; A01B 79/005; Y02A 40/10; G06Q 10/04; G06Q 10/06315; G06Q 50/02; G06Q 50/06
See application file for complete search history.

(56) References Cited

U.S. PATENT DOCUMENTS

2012/0290140 A1* 11/2012 Groeneveld ........... A01G 22/00
700/284

* cited by examiner

*Primary Examiner* — Chad G Erdman
(74) *Attorney, Agent, or Firm* — Bayramoglu Law Offices LLC (57) ABSTRACT

A system and method for optimal allocation of agricultural water based on water consumption control are provided. The system includes a data management module, configured to store and manage data related to water allocation; a basic data statistics module, configured to take statistics on various stored data; an agricultural evapotranspiration (ET) calculation module, configured to calculate an agricultural ET based on the stored data and statistical data; and a water resource allocation module, configured to generate a corresponding water resource allocation scheme based on an agricultural ET of each water consumption unit and corresponding data. Surface water and groundwater are jointly allocated to reduce groundwater exploitation, increase groundwater recharge, reduce invalid water loss and consumption in a carrying and allocation process, and improve an output benefit of agricultural water supply. This provides technical support for realization of agricultural target ETs in different hydrologic years and sustainable utilization of water resources.

5 Claims, 11 Drawing Sheets

SYSTEM AND METHOD FOR OPTIMAL ALLOCATION OF AGRICULTURAL WATER BASED ON WATER CONSUMPTION CONTROL

CROSS REFERENCE TO THE RELATED APPLICATIONS

This application is based upon and claims priority to Chinese Patent Application No. 202010473018.9, filed on May 29, 2020, the entire contents of which are incorporated herein by reference.

TECHNICAL FIELD

The present invention relates to the technical field of water resource allocation, and more particularly, to a system and method for optimal allocation of agricultural water based on water consumption control.

BACKGROUND

Traditional water resource management places an emphasis on a balance between supply and demand, focusing on water conservation, while carrying out relatively little research on actual water resource consumption in various water use processes. Due to restrictions of evapotranspiration (ET) water consumption monitoring methods and technologies, research on ET management of water-saving agriculture in China is mostly limited to management of farmland irrigation water. As a new technology, comprehensive implementation of ET management in a basin has no successful application in China and other countries. With the development of satellite sensing technology, it is possible to use remote sensing data and models to perform inversion on a regional ET. Remote sensing-based ET measurement is continuous in space and dynamically changes over time, and can express temporal and spatial distributions and changes of ET. ET data is obtained through remote sensing with different scales, and then regional water consumption management is performed based on ET data.

At present, most prior irrigation water allocation decisions in China and other countries establish a water allocation model based on experience or assumptions, and water is allocated based on a historical water supply rather than water demands of crops. Most water allocation results, therefore, do not accord with the actual water demands of the crops, but are research results obtained in a planned water allocation mode. There are few research results of water allocation based on actual water consumption. In terms of water allocation technologies, for most prior agricultural water allocation models, a calculation unit is a sub-basin, an irrigated region, or a county. This cannot guarantee precision requirements of water allocation by township, by village, and by farmland.

SUMMARY

In view of the above shortcomings in the prior art, a system and method for optimal allocation of agricultural water based on water consumption control in the present invention introduce a concept of ET management, and integrate ET monitoring and control methods and technologies, so that agricultural target ETs in different stages are determined, and a spatial layout of agricultural water is optimized based on an ET red line.

To achieve the above objectives, the present invention adopts the following technical solutions. A system for optimal allocation of agricultural water based on water consumption control includes:

a data management module, configured to store and manage support data related to the optimal allocation of agricultural water;

a basic data statistics module, configured to take statistics on various stored support data;

an agricultural evapotranspiration (ET) calculation module, configured to calculate an agricultural ET based on the stored support data and statistical data obtained by the basic data statistics module; and a water resource allocation module, configured to generate a corresponding water resource allocation scheme based on the agricultural ET calculated by each water consumption unit and the stored support data.

Further, the support data in the data management module includes runoff data, a basic farmland area, a non-basic farmland area, an irrigation schedule, ET red line data, and user data. The statistical data obtained by the basic data statistics module includes a runoff, a reservoir eigenvalue, a reservoir-storage capacity relationship curve, reservoir evaporation data, and an industrial and ecological water demand in each water consumption unit. The agricultural ET calculated by the agricultural ET calculation module includes a basic farmland ET, a non-basic farmland ET, and a minimum farmland irrigation amount in each water consumption unit, which are obtained through statistics by a month or ten days.

Further, the water resource allocation module includes a water resource allocation unit and an allocation scheme comparison unit.

The water resource allocation unit is configured to generate a basic farmland water allocation scheme and a non-basic farmland water allocation scheme that correspond to a water consumption unit in a planning level year according to an initial storage capacity of the water consumption unit, a set runoff design assurance rate, and parameters corresponding to the planning level year.

The allocation scheme comparison unit is configured to generate a comparison result of basic farmland water allocation schemes and a comparison result of non-basic farmland water allocation schemes under different runoff design assurance rates in the level year according to the initial storage capacity of the water consumption unit and parameters corresponding to the selected level year.

Further, the system for optimal allocation of agricultural water further includes a remote sensing-based ET warning module. The remote sensing-based ET warning module is configured to take statistics on ET data of each water consumption unit according to the set ET red line data and remote sensing-based ET data, and then carry out remote sensing-based ET warning for each water consumption unit.

A method for optimal allocation of agricultural water based on water consumption control includes the following steps:

S1: determining target ET-compliant irrigation water demands of each water consumption unit in different frequency years based on data in an agricultural ET calculation module;

S2: determining a water allocation rule of each water consumption unit during water resource allocation based on data stored in a data management module;

S3: establishing an ET-based optimal water allocation model based on the data in the data management module and data in a basic data statistics module;

S4: determining a constraint corresponding to each water consumption unit based on the data in the data management module and the data in the basic data statistics module; and S5: linearly solving the ET-based optimal water allocation model on the basis of satisfying the water allocation rule and the constraint according to an irrigation water demand determined by a water consumption unit to be subjected to water allocation, to obtain an optimal allocation result of the agricultural water of the water consumption unit.

Further, the water allocation rule in step S2 includes giving priority to a water demand of a contracted farmland in each water consumption unit, giving priority to water allocation for a water user with an intact canal system and adjacent to a reservoir or a river in each water consumption unit, and giving priority to use of surface water in each water consumption unit.

Further, in step S3, a minimum water deficit of surface water for an agricultural irrigation in a region to be subjected to the water allocation is taken as an objective function of the ET-based optimal water allocation model.

The objective function is:

$$\sum_{i=1}^{I}\sum_{t=1}^{T}(ET_{i,t}^{1}+ET_{i,t}^{2})-\left(\alpha_1\sum_{i=1}^{I}\sum_{t=1}^{T}\eta_i x_{i,t}^{1}+\alpha_2\sum_{i=1}^{I}\sum_{t=1}^{T}\eta_i x_{i,t}^{2}\right)=0,$$

wherein, $x_{i,t}^{1}$ represents a surface water supply for a contracted farmland of the $i^{th}$ water user at the $t^{th}$ time segment; $x_{i,t}^{2}$ represents a surface water supply for a non-contracted farmland of the $i^{th}$ water user at the $t^{th}$ time segment; $ET_{i,t}^{1}$ represents a water demand of the contracted farmland of the $i^{th}$ water user at the $t^{th}$ time segment; $E_{i,t}^{2}$ represents a water demand of the non-contracted farmland of the $i^{th}$ water user at the $t^{th}$ time segment; $\alpha_1$ and $\alpha_2$ represent a first weight coefficient and a second weight coefficient of a water supply priority, respectively; $\eta_i$ represents a utilization coefficient of irrigation water of the $i^{th}$ water user; and I represents a quantity of water users, and T represents a quantity of time segments.

Further, the constraint in step S4 includes a constraint on a hydrologic budget of a reservoir or a river, a water demand constraint, a reservoir constraint, a constraint on a water carrying capacity of a canal, a constraint on a minimum surface water supply for a township, and a constraint on water diversion and use of a basin.

Further, the constraint on the hydrologic budget of the reservoir or the river includes a constraint on a hydrologic budget of a controlled reservoir when the controlled reservoir exists, and a constraint on a hydrologic budget of the river when the controlled reservoir does not exist.

The constraint on the hydrologic budget of the controlled reservoir when the controlled reservoir exists is:

$$V_t = V_{t-1} - \left(\sum_{i=1}^{I} x_{i,t}^{1} + \sum_{i=1}^{I} x_{i,t}^{2}\right) + R_t - S_t - E_t - D_t + WI_t - WO_t,$$

wherein, $V_t$ and $V_{t-1}$ represent a storage capacity at the $t^{th}$ time segment and a storage capacity at the $t-1^{th}$ time segment of the reservoir, respectively; $S_t$ represents an amount of water leaked from the reservoir at the $t^{th}$ time segment; $E_t$ represents an amount of water evaporated from the reservoir at the $t^{th}$ time segment; $R_t$ represents an amount of water flowing into the reservoir at the $t^{th}$ time segment; $D_t$ represents a water supply of the reservoir for another industry at the $t^{th}$ time segment; $WI_t$ represents an amount of water diverted from another basin at the $t^{th}$ time segment; and $WO_t$ represents an amount of water diverted to the basin at the $t^{th}$ time segment.

The constraint on the hydrologic budget of the river when the controlled reservoir does not exist is:

$$RD_t = \left(\sum_{i=1}^{I} x_{i,t}^{1} + \sum_{i=1}^{I} x_{i,t}^{2}\right) + RXH_t,$$

wherein, $RD_t$ represents an amount of water usable in the river for the agricultural irrigation at the $t^{th}$ time segment; and $RXH_t$ represents an amount of water unusable by the river at the $t^{th}$ time segment.

The water demand constraint includes a water demand constraint for the contracted farmland and a water demand constraint for the non-contracted farmland.

The water demand constraint for the contracted farmland is:

$$\eta_i x_{i,t}^{1} \leq ET_{i,t}^{1} - 1000 A_i^{1} P_{i,t}^{1},$$

the water demand constraint for the non-contracted farmland is:

$$\eta_i x_{i,t}^{2} \leq ET_{i,t}^{2} - 1000 A_i^{2} P_{i,t}^{2},$$

wherein, $A_{i,t}^{1}$ and $A_{i,t}^{2}$ represent an area of the contracted farmland and an area of the non-contracted farmland of the $i^{th}$ water user, respectively; and $P_{i,t}^{1}$ and $P_{i,t}^{2}$ represent a valid rainfall of the contracted farmland and a valid rainfall of the non-contracted farmland of the $i^{th}$ water user at the $t^{th}$ time segment, respectively.

The reservoir constraint is:

$$V\text{Min}_t \leq V_t \leq V\text{Max}_t,$$

wherein, $V\text{Max}_t$ and $V\text{Min}_t$ represent a maximum capacity and a minimum storage capacity of the reservoir at the $t^{th}$ time point, respectively.

The constraint on the water carrying capacity of the canal is:

$$\sum_{i=1}^{I_j}(x_{i,t}^{1}+x_{i,t}^{2}) \leq QMax_{j,t},$$

wherein, $QMax_{j,t}$ represents a maximum water carrying capacity of the $j^{th}$ canal at the $t^{th}$ time segment; and $I_j$ represents a water user for which the $j^{th}$ canal provides water.

The constraint on the minimum surface water supply for the township is:

$$V\text{Min}_t \leq V_t \leq V\text{Max}_t,$$

wherein, $M_{i,t}$ represents a minimum surface water supply for the contracted farmland of the $i^{th}$ water user at the $t^{th}$ time segment.

The constraint on the water diversion and use of the basin is:

$$\sum_{i=1}^{K}(x_{i,t}^{1}+x_{i,t}^{2}) \leq RLoc_t,$$

wherein, K represents a quantity of upstream villages, namely water user associations, of a water diversion point; and $RLoc_t$ represents a self-produced runoff of the basin or the amount of water usable in the river for the agricultural irrigation at the $t^{th}$ time segment.

The present invention has the following beneficial effects:

(1) The system of the present invention introduces the concept of "ET management", and integrates ET monitoring and control methods and technologies, so that agricultural target ETs in different stages are determined. Based on adjustment of irrigation area, layout of water-saving irrigation area, optimization of a planting structure, and other measures, a spatial layout of agricultural water is optimized based on the ET red line. Optimal allocation of water resources for a multi-source and multi-user basin is realized based on the ET red line, a water storage capacity of the reservoir, a dynamic water amount change, optimal adjustment of water demands of crops, control over a water carrying and allocation capacity of the canal, priority to guarantee for a basic farmland water demand, and other constraints. A water allocation scheme for an irrigated region or a sub-basin is recommended based on the ET red line, to optimize irrigation water demanding processes with different target ETs, and transform water resources from "water supply management" to "water supply management+water consumption management".

(2) The system of the present invention can realize spatial water allocation units by farmland, by village, and by township. In addition, in terms of time, the system further predicts a farmland water demand by a month or ten days. Therefore, compared with similar technologies in China and other countries, the system of the present invention can realize distributed and fine management of irrigation water in time and space, which uses a region with abundant water to make up for a region lack of water in space, and realizes reasonable water allocation and storage in time, so as to realize optimal allocation of water sources. This really realizes reasonable allocation of regional irrigation water.

(3) The system is applicable to joint allocation schemes for surface water and groundwater in the basin, and water resource allocation schemes for matching and modern reconstruction projects and other farmland water conservancy projects in the irrigated region. The system is characterized by cost-effectiveness, convenient management, one investment, and low maintenance costs, and provides important technical support for regional water consumption management and improves a management level of agricultural water.

DETAILED DESCRIPTION OF THE EMBODIMENTS

Embodiments of the present invention are described in detail below to facilitate those skilled in the art to understand the present invention, but it should be noted that the present invention is not limited to the scope of the embodiments. For those skilled in the art, as long as various changes are within the spirit and scope, limited and determined by the appended claims, of the present invention, these changes are obvious, and all inventions and innovations using the concept of the present invention shall fall within the scope of protection of the present invention.

To realize optimal allocation of agricultural water, an allocation system and method provided in the present invention relate to the following technical contents.

(1) Agricultural Water Saving Planning Based on an ET Red Line

Based on adjustment of irrigation area, layout of water-saving irrigation area, optimization of a planting structure, and other measures, agricultural target ETs in different stages are met, groundwater exploitation is reduced, efficiency and benefits of agricultural water are improved. This realizes reasonable allocation and efficient utilization of water resources, and reduces agricultural water and the total amount of consumed water while ensuring an increase of farmers' income and sustainable development of the agriculture.

(2) Irrigation Water Demand Meeting the Target ET

A water user association is used as a basic unit. For water demanding frequencies under different climatic conditions, an irrigation rate map under a combination of a plurality of kinds of crops is optimized based on crop planting structures and irrigation area in different water consumption units as well as target ET-compliant irrigation schedule combination schemes for different crops, to obtain irrigation water demanding processes in different frequency years.

(3) Optimal Allocation of Water Resources for a Multi-Source and Multi-User Basin Based on the principle of linear planning, and with a purpose of minimizing groundwater exploitation, the ET red line, a water storage capacity of a reservoir, and a dynamic water amount change are fully considered, water demands of crops are optimized and adjusted, a water carrying and allocation capacity of a canal is controlled, and basic farmland water demands are first guaranteed, so as to form a method for optimal allocation of the water resources for the multi-source and multi-user basin.

(4) ET-Based Agricultural Water Allocation Model

Figure 1:
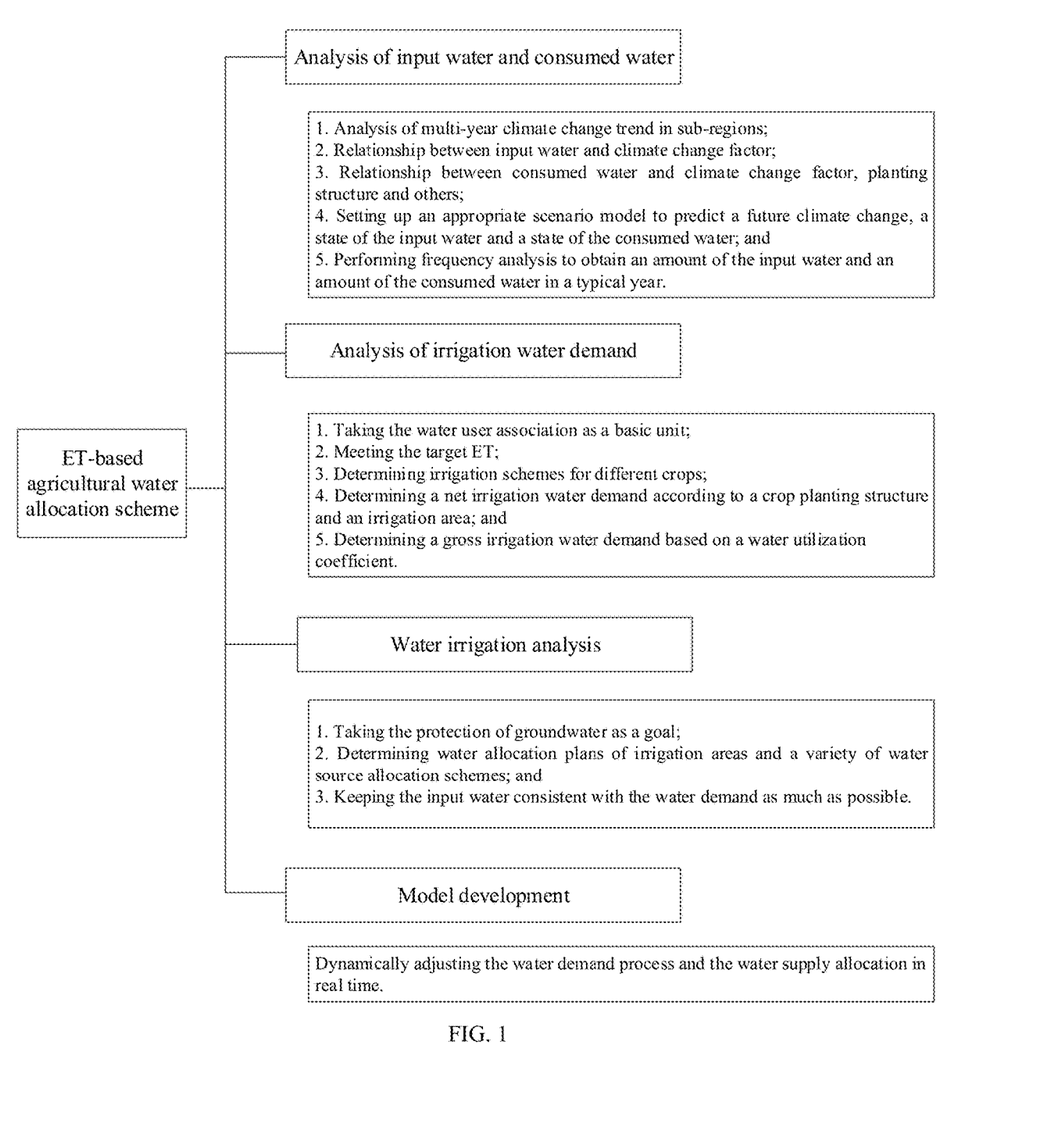
FIG. 1 is a technology roadmap for realizing water allocation by a system for optimal allocation of agricultural water based on water consumption control according to the present invention.

The geographic information system (GIS) is combined with a water resource allocation model, to realize visualization of a model. The system uses a secondary development technology of the GIS to realize functions of managing basic irrigation data, displaying an agricultural ET, optimizing a water resource allocation scheme, observing, controlling, and prompting water consumption based on an ET obtained through remote sensing, and the like. In this way, objectives of analyzing irrigation water demanding processes with different target ETs, recommending a target ET-compliant water allocation scheme for an irrigated region or a sub-basin, and the like are achieved. FIG. 1 shows a technology roadmap for water allocation in the present invention.

Embodiment 1

Based on the above technical contents, according to the embodiment of the present invention, a system for optimal allocation of agricultural water based on water consumption control includes:

a data management module, configured to store and manage support data related to optimal allocation of agricultural water;

a basic data statistics module, configured to take statistics on various stored support data;

an agricultural ET calculation module, configured to calculate an agricultural ET based on the stored support data and statistical data obtained by the basic data statistics module; and a water resource allocation module, configured to generate a corresponding water resource allocation scheme based on an agricultural ET calculated by each water consumption unit and the stored support data.

Specifically, the water resource allocation module in the embodiment of the present invention includes a water resource allocation unit and an allocation scheme comparison unit. The water resource allocation unit generates a basic farmland water allocation scheme and a non-basic farmland water allocation scheme that correspond to the water consumption unit in a planning level year according to an initial storage capacity of the water consumption unit, a set runoff design assurance rate, and parameters corresponding to the planning level year. The allocation scheme comparison unit generates a comparison result of basic farmland water allocation schemes and a comparison result of non-basic farmland water allocation schemes under different runoff design assurance rates in the level year according to the initial storage capacity of the water consumption unit and parameters corresponding to the selected level year.

The support data in the data management module in the embodiment of the present invention includes runoff data, a basic farmland area, a non-basic farmland area, an irrigation schedule, ET red line data, and user data. The statistical data obtained by the basic data statistics module includes a runoff, a reservoir eigenvalue, a reservoir-storage capacity relationship curve, reservoir evaporation data, and an industrial and ecological water demand in each water consumption unit. The agricultural ET calculated by the agricultural ET calculation module includes a basic farmland ET, a non-basic farmland ET, and a minimum farmland irrigation amount in each water consumption unit, which are obtained through statistics by a month or ten days.

The system for optimal allocation of agricultural water in the embodiment of the present invention further includes a remote sensing-based ET warning module. The remote sensing-based ET warning module is configured to take statistics on ET data of each water consumption unit according to the set ET red line data and the remote sensing-based ET data, and then carry out remote sensing-based ET warning for each water consumption unit.

The system of the present invention introduces a concept of ET management, and transforms a traditional manner of "water supply management" to a manner of "water supply management+water consumption management", so as to provide a new method and means for water resource management in a region that lacks water resources in China. On the basis of a traditional ET quota-based agricultural water-saving plan and a quota control scheme for high-efficiency water-saving irrigation, the ET-based agricultural water allocation system is provided to control agricultural water and consumed water from the source of water supply. Surface water and groundwater are jointly allocated to reduce groundwater exploitation, increase groundwater recharge, reduce invalid water loss and consumption in a carrying and allocation process, and improve an output benefit of agricultural water supply. This provides technical support for realization of agricultural target ETs in different hydrologic years and sustainable utilization of water resources.

Embodiment 2

Figure 2:
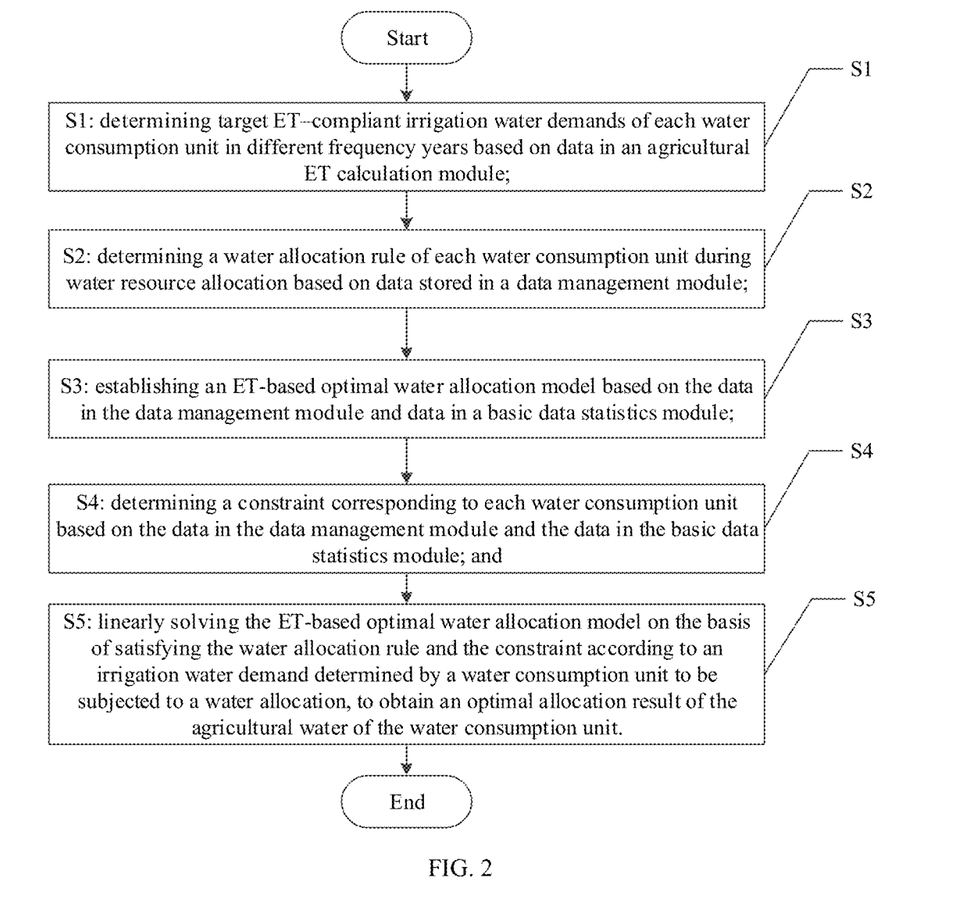
FIG. 2 is a flowchart of a method for optimal allocation of agricultural water based on water consumption control according to the present invention.

As shown in FIG. 2, the embodiment of the present invention provides a method for optimal allocation of agricultural water corresponding to Embodiment 1, including the following steps.

S1: target ET-compliant irrigation water demands of each water consumption unit in different frequency years are determined based on data in an agricultural ET calculation module.

S2: a water allocation rule of each water consumption unit during water resource allocation is determined based on data stored in a data management module.

S3: an ET-based optimal water allocation model is established based on the data in the data management module and data in a basic data statistics module.

S4: a constraint corresponding to each water consumption unit is determined based on the data in the data management module and the data in the basic data statistics module.

S5: the ET-based optimal water allocation model is solved linearly on the basis of satisfying the water allocation rule and the constraint according to an irrigation water demand determined by a water consumption unit to be subjected to water allocation, to obtain an optimal allocation result of agricultural water of the water consumption unit.

In the embodiment of the present invention, based on irrigation water demands of each water consumption unit (each water user association is a water consumption unit) in different level years, as well as input surface water, water demands of reservoirs, water carrying and allocation capacities of canals, and other data in the region, the surface water is used as a water allocation source, and allocation schemes for a typical irrigation canal or sub-basin in different level years are comprehensively determined. Therefore, the ET calculation in step S1 includes: using a water user association as a basic unit; and for water demanding frequencies under different climatic conditions, optimizing an irrigation rate map under a combination of a plurality of kinds of crops based on crop planting structures and irrigation area in different water consumption units as well as target ET-compliant irrigation schedule combination schemes for different crops, to obtain irrigation water demanding processes in different frequency years.

The water allocation rule in step S2 in the embodiment of the present invention includes:

(1) giving priority to a water demand of a contracted farmland in each water consumption unit;

(2) giving, based on an actual situation, priority to water allocation for a water user with an intact canal system and adjacent to a reservoir or a river in each water consumption unit; and (3) giving priority to use of surface water in each water consumption unit, and protecting groundwater resources.

In step S3 in the embodiment of the present invention, based on the above water allocation rule, minimizing a groundwater supply is taken as an objective. That is, a minimum water deficit of surface water for agricultural irrigation in a region to be subjected to water allocation is taken as an objective function of the ET-based agricultural water allocation model.

The objective function is:

$$\sum_{i=1}^{I}\sum_{t=1}^{T}(ET_{i,t}^1 + ET_{i,t}^2) - \left(\alpha_1 \sum_{i=1}^{I}\sum_{t=1}^{T}\eta_i x_{i,t}^1 + \alpha_2 \sum_{i=1}^{I}\sum_{t=1}^{T}\eta_i x_{i,t}^2\right) = 0,$$

where, $x_{i,t}^1$ represents a surface water supply for a contracted farmland of the $i^{th}$ water user at the $t^{th}$ time segment; $x_{i,t}^2$ represents a surface water supply for a non-contracted farmland of the $i^{th}$ water user at the $t^{th}$ time segment; $ET_{i,t}^1$ represents a water demand of the contracted farmland of the $i^{th}$ water user at the $t^{th}$ time segment; $ET_{i,t}^2$ represents a water demand of the non-contracted farmland of the $i^{th}$ water user at the $t^{th}$ time segment; $\alpha_1$ and $\alpha_2$ represent a first weight coefficient and a second weight coefficient of a water supply priority, respectively; $\eta_i$ represents a utilization coefficient of irrigation water of the $i^{th}$ water user; and I represents a quantity of water users, and T represents a quantity of time segments.

The constraint in step S4 in the embodiment of the present invention includes a constraint on a hydrologic budget of a reservoir or a river, a water demand constraint, a reservoir constraint, a constraint on a water carrying capacity of a canal, a constraint on a minimum surface water supply for a township, and a constraint on water diversion and use of a basin.

Specifically, the constraint on the hydrologic budget of the reservoir or the river includes a constraint on a hydrologic budget of a controlled reservoir when the controlled reservoir exists, and a constraint on a hydrologic budget of a river when the controlled reservoir does not exist.

For a basin with the controlled reservoir, it is necessary to consider reservoir leakage and evaporation, and water used for other industries. In other words, the constraint on the hydrologic budget of the controlled reservoir when the controlled reservoir exists is:

$$V_t = V_{t-1} - \left(\sum_{i=1}^{I} x_{i,t}^1 + \sum_{i=1}^{I} x_{i,t}^2\right) + R_t - S_t - E_t - D_t + WI_t - WO_t,$$

where, $V^t$ and $V_{t-1}$ represent a storage capacity at the $t^{th}$ time segment and a storage capacity at the $t-1^{th}$ time segment of the reservoir, respectively; $S_t$ represents an amount of water leaked from the reservoir at the $t^{th}$ time segment; $E_t$ represents an amount of water evaporated from the reservoir at the $t^{th}$ time segment; $R_t$ represents an amount of water flowing into the reservoir at the $t^{th}$ time segment; $D_t$ represents a water supply of the reservoir for another industry at the $t^{th}$ time segment; $WI_t$ represents an amount of water diverted from another basin at the $t^{th}$ time segment; and $WO_t$ represents an amount of water diverted to the basin at the $t^{th}$ time segment.

For a basin without the controlled reservoir, the constraint on the hydrologic budget of the river is:

$$RD_t = \left(\sum_{i=1}^{I} x_{i,t}^1 + \sum_{i=1}^{I} x_{i,t}^2\right) + RXH_t,$$

where, $RD_t$ represents an amount of water usable in the river for agricultural irrigation at the $t^{th}$ time segment; and $RXH_t$ represents an amount of water unusable by the river at the $t^{th}$ time segment.

The water demand constraint includes a water demand constraint for the contracted farmland and a water demand constraint for the non-contracted farmland.

The water demand constraint for the contracted farmland is:

$$\eta_i x_{i,t}^1 \leq ET_{i,t}^1 - 1000 A_i^1 P_{i,t}^1,$$

the water demand constraint for the non-contracted farmland is:

$$\eta_i x_{i,t}^2 \leq ET_{i,t}^2 - 1000 A_i^2 P_{i,t}^2,$$

where, $A_{i,t}^1$ and $A_{i,t}^2$ represent an area of the contracted farmland and an area of the non-contracted farmland of the $i^{th}$ water user, respectively; and $P_{i,t}^1$ and $P_{i,t}^2$ represent a valid rainfall of the contracted farmland and a valid rainfall of the non-contracted farmland of the $i^{th}$ water user at the $t^{th}$ time segment, respectively.

The reservoir constraint is:

$$V\text{Min}_t \leq V_t \leq V\text{Max}_t,$$

where, $V\text{Max}_t$ and $V\text{Min}_t$ represent a maximum storage capacity and a minimum storage capacity of the reservoir at the $t^{th}$ time point, respectively.

The constraint on the water carrying capacity of the canal is:

$$\sum_{i=1}^{I_j} (x_{i,t}^1 + x_{i,t}^2) \leq Q\text{Max}_{j,t},$$

where, $Q\text{Max}_{j,t}$ represents a maximum water carrying capacity of the $j^{th}$ canal at the $t^{th}$ time segment; and $I_j$ represents a water user for which the $j^{th}$ canal provides water.

In order to respect a water use history of water users in each township, a minimum surface water supply for the contracted farmland of each township is taken as a constraint to reflect the water use history. Therefore, the constraint on the minimum surface water supply for the township is:

$$x_{i,t}^1 \geq M_{i,t},$$

where, $M_{i,t}$ represents a minimum surface water supply for the contracted farmland of the $i^{th}$ water user at the $t^{th}$ time segment.

When there exists an external water source in a basin, the constraint on the water diversion and use of the basin is imposed on the upstream of a water diversion point, and is expressed as:

$$\sum_{i=1}^{K} (x_{i,t}^1 + x_{i,t}^2) \leq RLoc_t,$$

where, K represents a quantity of upstream villages, namely water user associations, of the water diversion point; and $RLoc_t$ represents a self-produced runoff of the basin or an amount of water usable in the river for the agricultural irrigation at the $t^{th}$ time segment.

Figure 3:
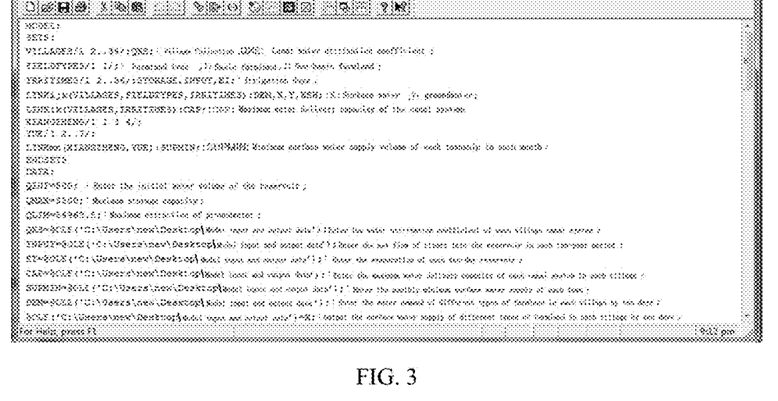
FIG. 3 is a schematic diagram of a process of solving an ET-based agricultural water allocation model according to the present invention.

In step S4 in the embodiment of the present invention, the ET-based agricultural water allocation model is a linear programming model. Therefore, a linear programming model of Ligo software is used to solve the optimal water allocation model. FIG. 3 shows a solving process of the model.

The system for optimal allocation of agricultural water based on the above water allocation model in the present invention can obtain optimal water resource allocation schemes under different planning level years and different assurance rates. The optimal schemes can be used to significantly improve utilization efficiency and benefits of water resources in a survey region, actually reduce agricultural water and consumed water, realize resource-based water saving, and provide a scientific basis for the water department to make a decision on allocation of water resources in the future. The system has the advantages of flexible parameter setting, intuitive and reliable schemes, and so on. The system is applicable to joint allocation schemes for surface water and groundwater in the basin, and water resource allocation schemes for matching and modern reconstruction projects and other farmland water conservancy projects in the irrigated region. The system has a significant reference value for realization of water-saving and optimal allocation of water resources in arid and water shortage regions.

Embodiment 3

The embodiment of the present invention provides a system for optimal water allocation in Turpan region, and a process for realizing water allocation.

Figure 4:
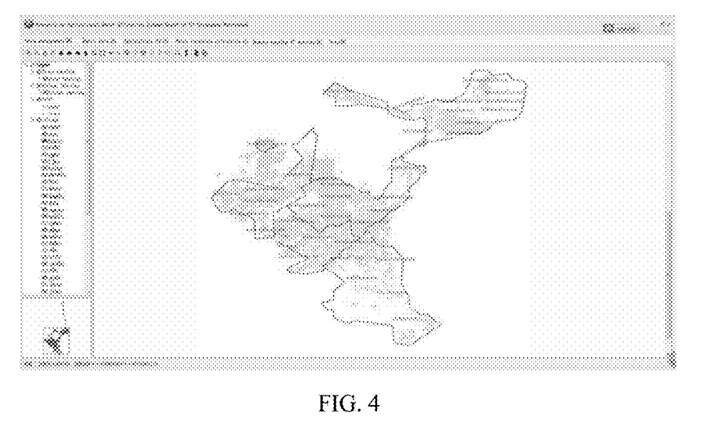
FIG. 4 is a schematic diagram of a main interface of a system for optimal allocation of agricultural water according to an embodiment of the present invention.
Figure 5:
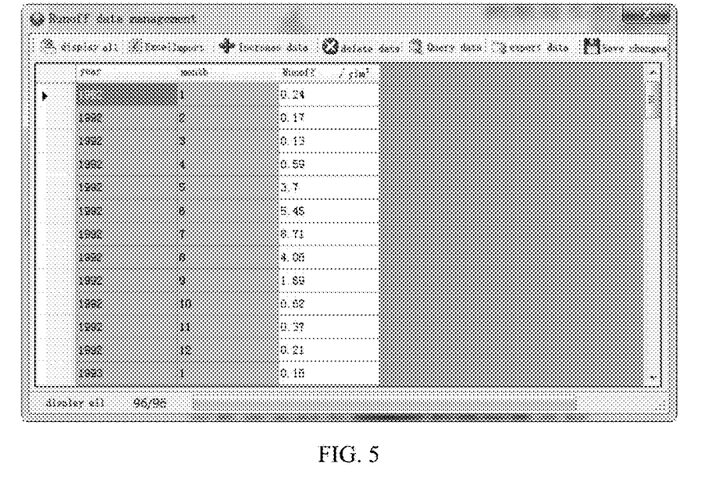
FIG. 5 is a schematic diagram of runoff data management according to an embodiment of the present invention.
Figure 6:
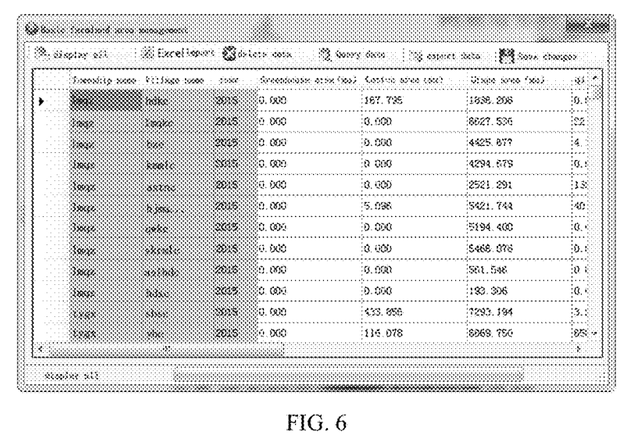
FIG. 6 is a schematic diagram of basic farmland management according to an embodiment of the present invention.
Figure 7:
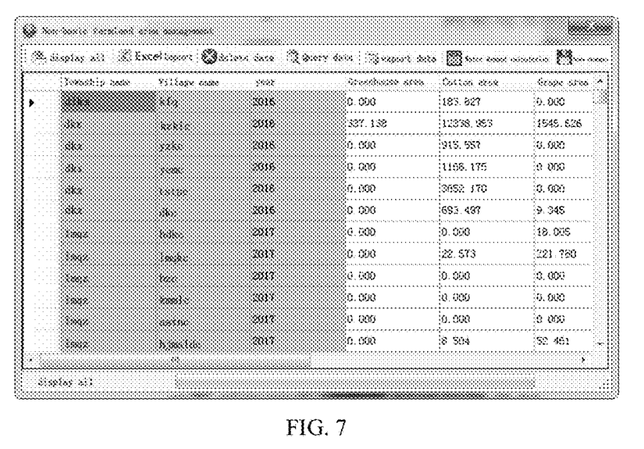
FIG. 7 is a schematic diagram of non-basic farmland management according to an embodiment of the present invention.
Figure 8:
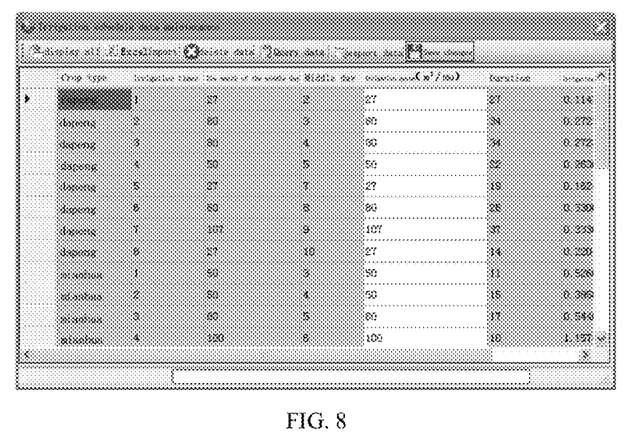
FIG. 8 is a schematic diagram of irrigation schedule data management according to an embodiment of the present invention.
Figure 9:
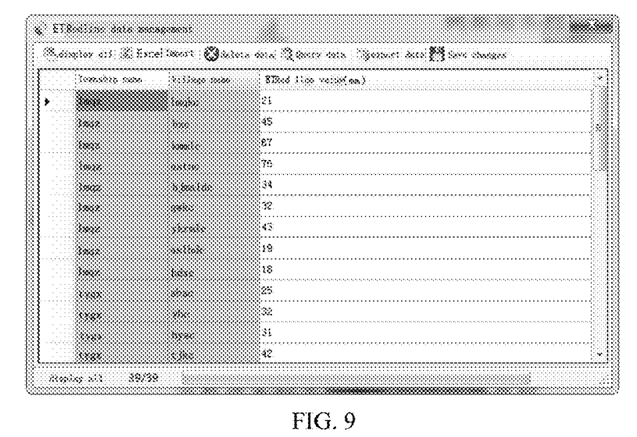
FIG. 9 is a schematic diagram of remote sensing-based ET data management according to an embodiment of the present invention.
Figure 10:
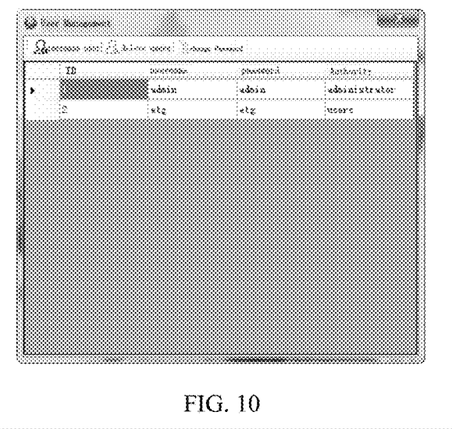
FIG. 10 is a schematic diagram of user management according to an embodiment of the present invention.

Based on an integrated development environment of VS 2010, the allocation system in the embodiment of the present invention employs a secondary development technology of a GIS and a database technology, integrates basic data such as a runoff, a basic farmland area, a non-basic farmland area, an irrigation schedule, remote sensing-based ET monitoring data of Ertanggou basin, and develops a system for agricultural water allocation and remote sensing-based ET monitoring and warning. The system includes:

(1) a main interface of the system, where the main interface is designed by using Ertanggou basin in Turpan as a base map, as shown in FIG. 4; and (2) a main menu of the system, including a data management module, a basic data statistics module, an agricultural ET calculation module, a water resource allocation module, and a remote sensing-based ET warning module.

The data management module manages actual support data of the system, including six submenus: runoff data, basic farmland area, non-basic farmland area, irrigation schedule, ET red line data, and user data (as shown in FIGS. 5-10). Each submenu has functions of importing, adding, deleting, querying, exporting, saving, and modifying data.

Figure 11:
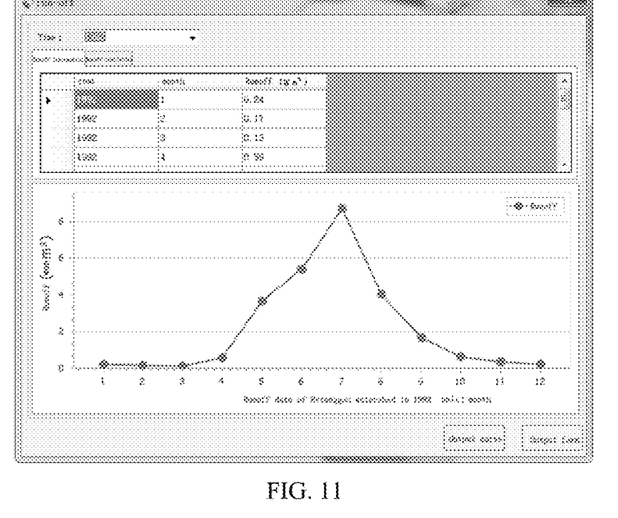
FIG. 11 is a schematic diagram of runoff data according to an embodiment of the present invention.
Figure 12:
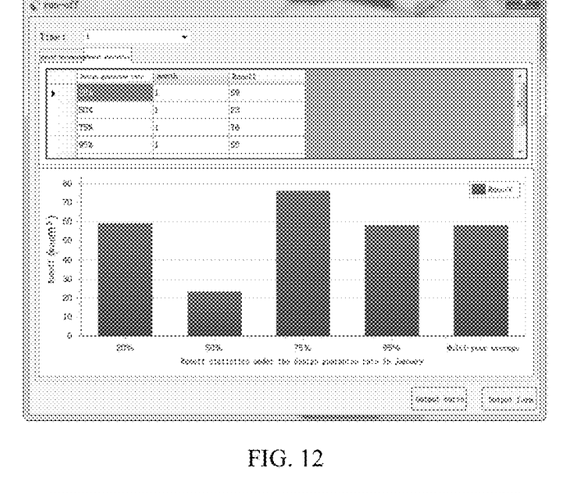
FIG. 12 is a schematic diagram of runoff statistics according to an embodiment of the present invention.
Figure 13:
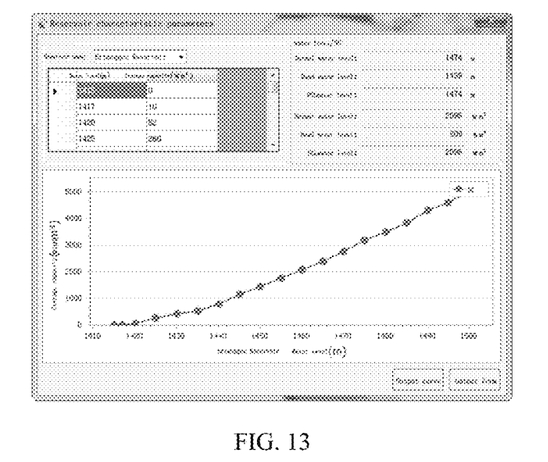
FIG. 13 is a schematic diagram of a reservoir eigenvalue according to an embodiment of the present invention.
Figure 14:
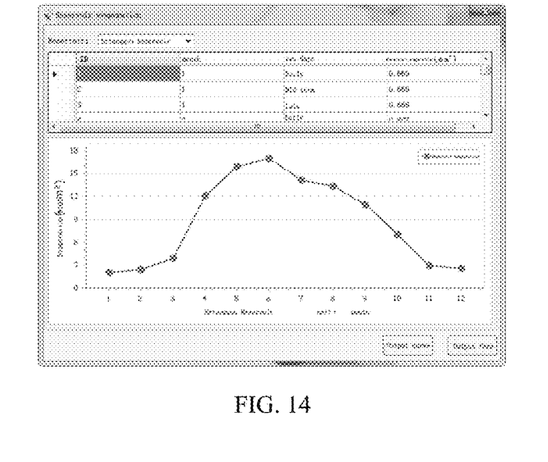
FIG. 14 is a schematic diagram of reservoir evaporation according to an embodiment of the present invention.
Figure 15:
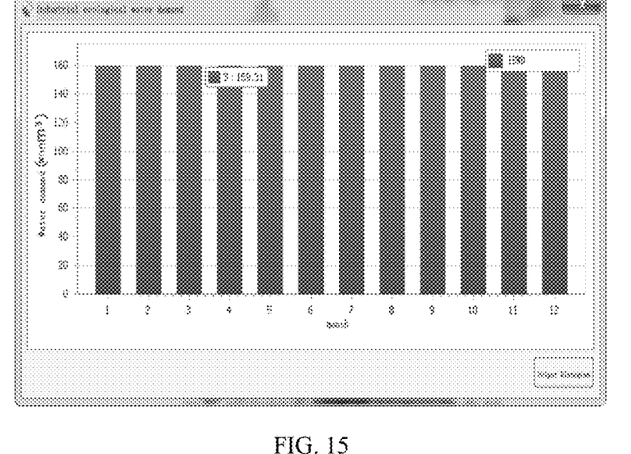
FIG. 15 is a schematic diagram of an industrial and ecological water demand according to an embodiment of the present invention.
Figure 16:
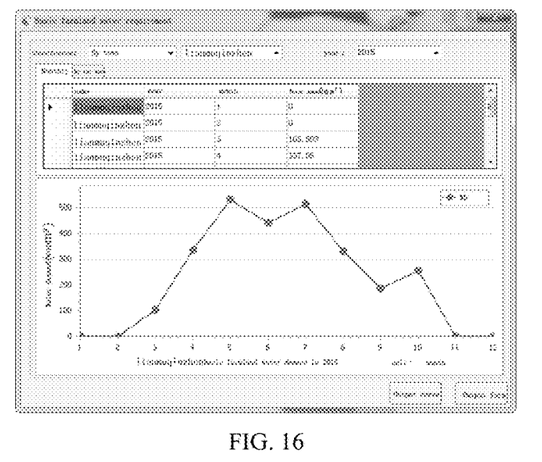
FIG. 16 is a schematic diagram of a basic farmland water demand obtained through statistics by a month according to an embodiment of the present invention.
Figure 17:
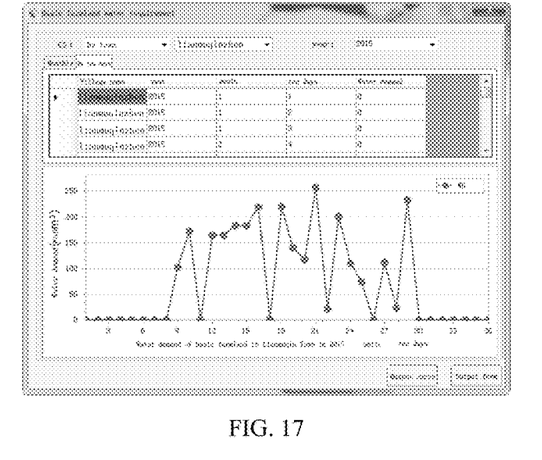
FIG. 17 is a schematic diagram of a basic farmland water demand obtained through statistics by ten days according to an embodiment of the present invention.
Figure 18:
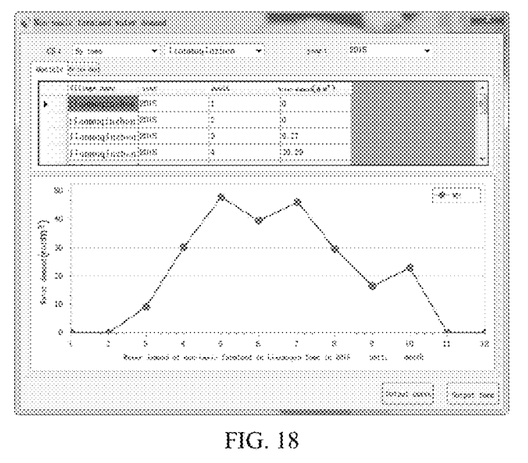
FIG. 18 is a schematic diagram of a non-basic farmland water demand obtained through statistics by a month according to an embodiment of the present invention.
Figure 19:
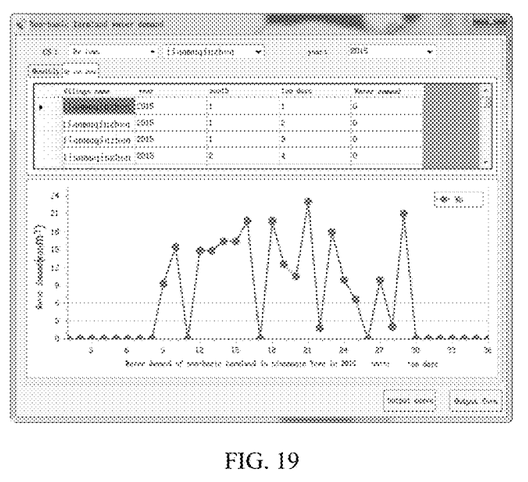
FIG. 19 is a schematic diagram of a non-basic farmland water demand obtained through statistics by ten days according to an embodiment of the present invention.

The basic data statistics module includes four submenus: runoff, reservoir eigenvalue, reservoir evaporation data, and industrial and ecological water demand. The runoff submenu displays runoff resources and runoff statistics, and outputs a corresponding curve chart and EXCEL table, as shown in FIG. 11 and FIG. 12. The reservoir evaporation data submenu displays reservoir evaporation data, and outputs a corresponding curve chart and EXCEL table, as shown in FIG. 13. The reservoir eigenvalue submenu displays reservoir eigenvalue data and a water level-storage capacity relationship curve, and outputs a curve chart and an EXCEL table, as shown in FIG. 14. The industrial and ecological water demand submenu outputs a curve chart and an EXCEL table, as shown in FIG. 15.

Figure 20:
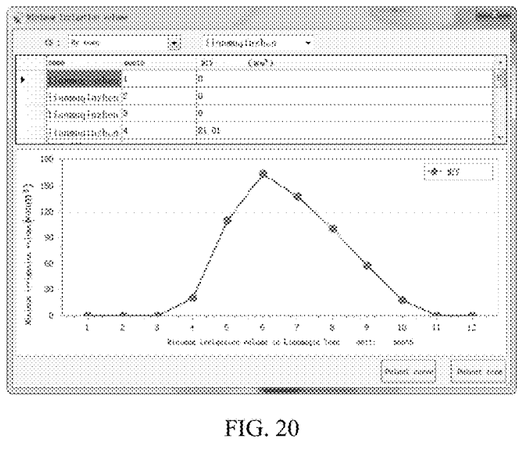
FIG. 20 is a schematic diagram of a minimum farmland irrigation amount according to an embodiment of the present invention.

The agricultural ET calculation module includes three submenus: basic farmland ET, non-basic farmland ET, and minimum farmland irrigation amount. The basic farmland water demand submenu displays a basic farmland water demand obtained through statistics by a month or ten days. The non-basic farmland water demand submenu displays a non-basic farmland water demand obtained through statistics by a month or ten days. For both the basic farmland ET submenu and the non-basic farmland ET submenu, classification statistics and displaying can be carried out by township, by village, and by basin, and curve charts and EXCEL tables can be output, as shown in FIGS. 16-19. The minimum farmland irrigation amount submenu displays a minimum farmland irrigation amount obtained through statistics by a month or ten days, and classification statistics and displaying can be carried out by township or village, and a curve chart and an EXCEL table can be output, as shown in FIG. 20.

Figure 21:
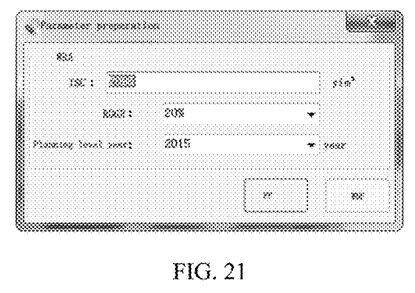
FIG. 21 is a schematic diagram of parameter preparation for calculating allocation schemes according to an embodiment of the present invention.
Figure 22:
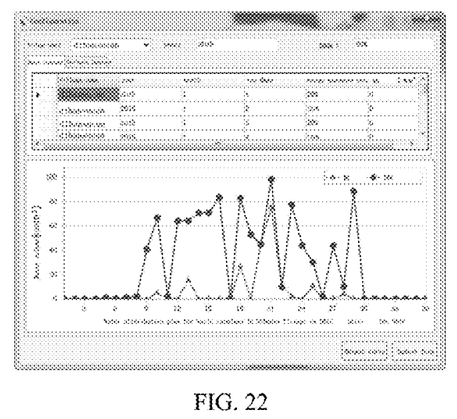
FIG. 22 is a schematic diagram of a basic farmland water allocation scheme according to an embodiment of the present invention.
Figure 23:
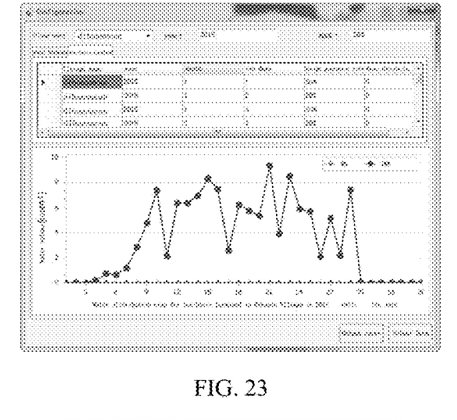
FIG. 23 is a schematic diagram of a non-basic farmland water allocation scheme according to an embodiment of the present invention.
Figure 24:
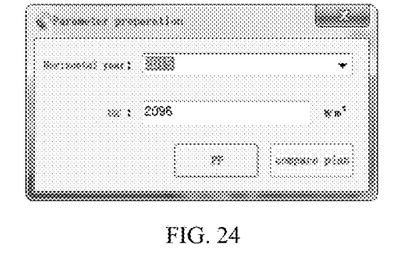
FIG. 24 is a schematic diagram of parameter preparation for comparing water allocation schemes according to an embodiment of the present invention.
Figure 25:
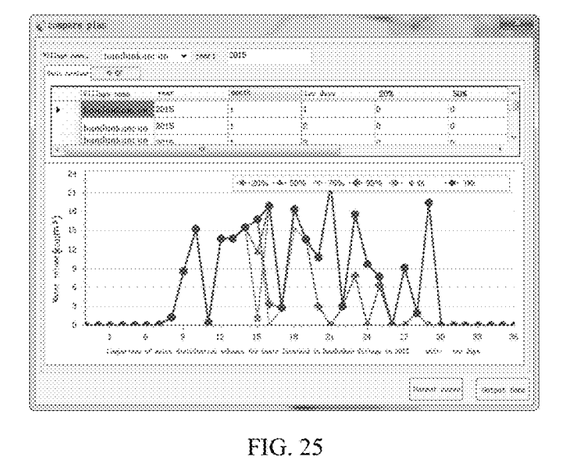
FIG. 25 is a schematic diagram of comparing basic farmland water allocation schemes according to an embodiment of the present invention.
Figure 26:
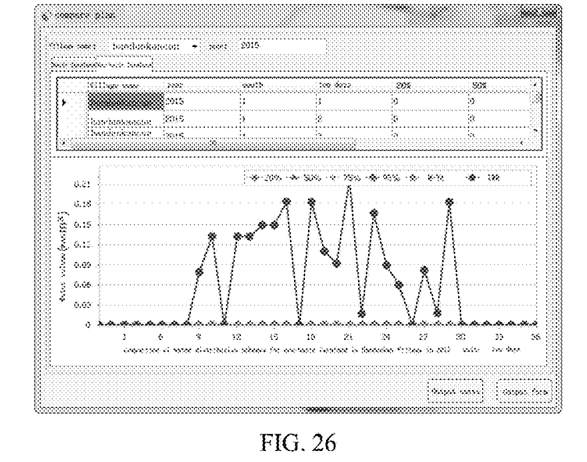
FIG. 26 is a schematic diagram of comparing non-basic farmland water allocation schemes according to an embodiment of the present invention.

The water resource allocation module includes two submenus: scheme allocation and scheme comparison. Under the scheme allocation submenu, an initial storage capacity, a runoff design assurance rate, and a planning level year are selected for parameter preparation, as shown in FIG. 21, to generate a basic farmland water allocation scheme and a non-basic farmland water allocation scheme under a runoff design assurance rate in a planning level year, as shown in FIG. 22 and FIG. 23. Under the scheme comparison submenu, a level year and an initial storage capacity are selected for parameter preparation, as shown in FIG. 24, to generate a comparison of basic farmland water allocation schemes and a comparison of non-basic farmland water allocation schemes under different runoff design assurance rates in the planning level year, as shown in FIG. 25 and FIG. 26.

Figure 27:
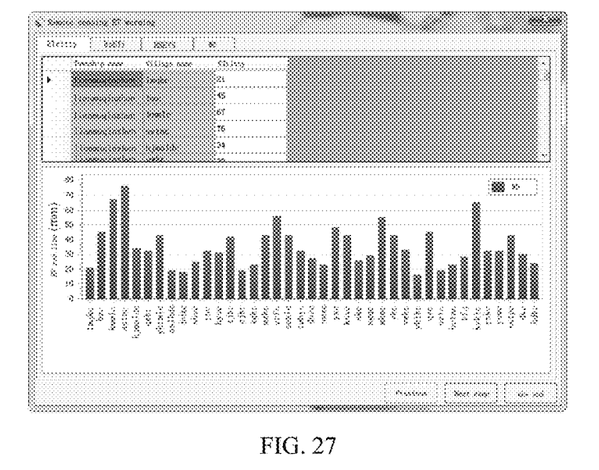
FIG. 27 is a schematic diagram of red lines in a whole year according to an embodiment of the present invention.
Figure 28:
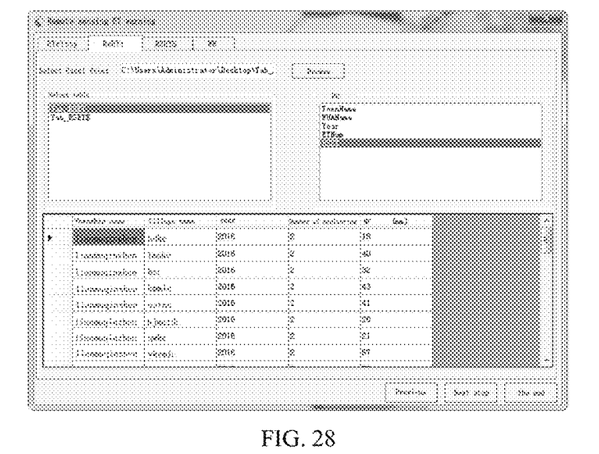
FIG. 28 is a schematic diagram of inputting remote sensing-based ET data according to an embodiment of the present invention.
Figure 29:
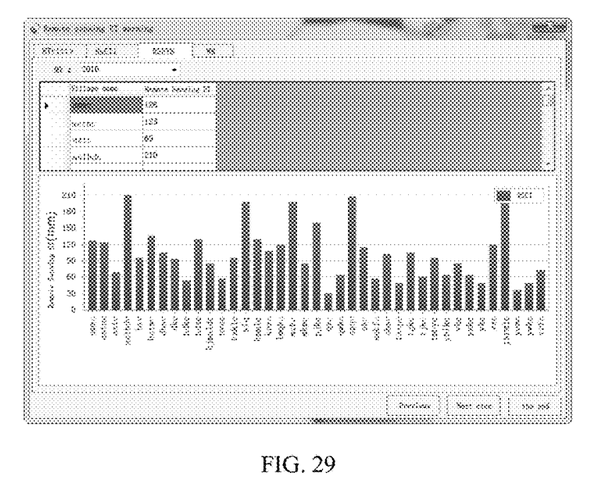
FIG. 29 is a schematic diagram of taking statistics on remote sensing-based ET data according to an embodiment of the present invention.
Figure 30:
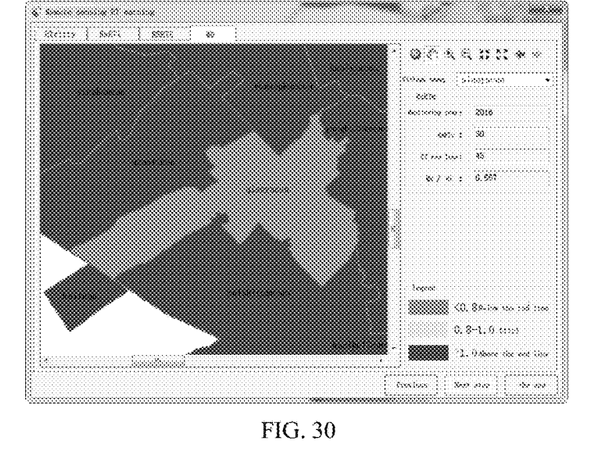
FIG. 30 is a schematic diagram showing a remote sensing-based ET warning result according to an embodiment of the present invention.

FIGS. 27-29 show a process in which the remote sensing-based ET warning module realizes remote sensing-based ET warning. ET red lines in a whole year are modified, and remote sensing-based ET data is input for statistics, so as to generate a corresponding remote sensing-based ET warning result, as shown in FIG. 30.

The present invention has the following advantages.

(1) The system of the present invention introduces the concept of "ET management", and integrates ET monitoring and control methods and technologies, so that agricultural target ETs in different stages are determined. Based on adjustment of irrigation area, layout of water-saving irrigation area, optimization of a planting structure, and other measures, a spatial layout of agricultural water is optimized based on the ET red line. Optimal allocation of water resources for a multi-source and multi-user basin is realized based on the ET red line, a water storage capacity of the reservoir, a dynamic water amount change, optimal adjustment of water demands of crops, control over a water carrying and allocation capacity of the canal, priority to guarantee for a basic farmland water demand, and other constraints. A water allocation scheme for an irrigated region or a sub-basin is recommended based on the ET red line, to optimize irrigation water demanding processes with different target ETs, and transform water resources from "water supply management" to "water supply management+water consumption management".

(2) The system of the present invention can realize spatial water allocation units by farmland, by village, and by township. In addition, in terms of time, the system further predicts a farmland water demand by a month or ten days. Therefore, compared with similar technologies in China and other countries, the system of the present invention can realize distributed and fine management of irrigation water in time and space, which uses a region with abundant water to make up for a region that lacks water in terms of space, and realizes reasonable water allocation and storage in terms of time, so as to realize optimal allocation of water sources. This significantly realizes reasonable allocation of regional irrigation water.

(3) The system is applicable to joint allocation schemes for surface water and groundwater in the basin, and water resource allocation schemes for matching and modern reconstruction projects and other farmland water conservancy projects in the irrigated region. The system is characterized by cost-effectiveness, convenient management, one investment, and low maintenance costs, and provides important technical support for regional water consumption management and improves a management level of agricultural water.

What is claimed is:

1. A method for an optimal allocation of an agricultural water based on a water consumption control, comprising the following steps:

S1: determining target evapotranspiration (ET)-compliant irrigation water demands of each water consumption unit in different frequency years based on data in an agricultural ET calculation module, wherein the water consumption unit is an association of water users;

S2: determining a water allocation rule of each water consumption unit during water resource allocation based on data stored in a data management module;

S3: establishing an ET-based optimal water allocation model based on the data in the data management module and data in a basic data statistics module;

S4: determining a constraint corresponding to each water consumption unit based on the data in the data management module and the data in the basic data statistics module;

S5: linearly solving the ET-based optimal water allocation model on a basis of satisfying the water allocation rule and the constraint according to an irrigation water demand determined by a water consumption unit to be subjected to a water allocation, to obtain an optimal allocation result of the agricultural water of the water consumption unit; and S6: implementing the optimal allocation result based on the target ET—compliant irrigation water demands, the optimal water allocation model and the constraint, wherein the implementing comprises controlling a distribution of water from at least one agricultural water source in accordance with the optimal allocation result.

2. The method according to claim 1, wherein
the water allocation rule in step S2 comprises:
giving priority to a water demand of a contracted farmland in each water consumption unit,
giving priority to the water allocation for a water user with an intact canal system and adjacent to a reservoir or a river in each water consumption unit, and
giving priority to use of surface water in each water consumption unit.

3. The method according to claim 1, wherein
in step S3, a minimum water deficit of surface water for an agricultural irrigation in a region to be subjected to the water allocation is taken as an objective function of the ET-based optimal water allocation model;
the objective function is:

$$\sum_{i=1}^{I}\sum_{t=1}^{T}(ET_{i,t}^1 + ET_{i,t}^2) - \left(\alpha_1 \sum_{i=1}^{I}\sum_{t=1}^{T}\eta_i x_{i,t}^1 + \alpha_2 \sum_{i=1}^{I}\sum_{t=1}^{T}\eta_i x_{i,t}^2\right) = 0,$$

wherein, $x_{i,t}^1$ represents a surface water supply for a contracted farmland of an $i^{th}$ water user at a $t^{th}$ time segment; $x_{i,t}^2$ represents a surface water supply for a non-contracted farmland of the $i^{th}$ water user at the $t^{th}$ time segment; $ET_{i,t}^1$ represents a water demand of the contracted farmland of the $i^{th}$ water user at the $t^{th}$ time segment; $ET_{i,t}^2$ represents a water demand of the non-contracted farmland of the $i^{th}$ water user at the $t^{th}$ time segment; $\alpha_1$ and $\alpha_2$ represent a first weight coefficient and a second weight coefficient of a water supply priority, respectively; $\eta_t$ represents a utilization coefficient of irrigation water of the $i^{th}$ water user; and I represents a quantity of water users, and T represents a quantity of time segments.

4. The method according to claim 3, wherein
the constraint in step S4 comprises a constraint on a hydrologic budget of a reservoir or a river, a water demand constraint, a reservoir constraint, a constraint on a water carrying capacity of a canal, a constraint on a minimum surface water supply for a township, and a constraint on water diversion and use of another basin.

5. The method according to claim 4, wherein
the constraint on the hydrologic budget of the reservoir or the river comprises a constraint on a hydrologic budget of a controlled reservoir when the controlled reservoir exists, and a constraint on a hydrologic budget of the river when the controlled reservoir does not exist;
the constraint on the hydrologic budget of the controlled reservoir when the controlled reservoir exists is:

$$V_t = V_{t-1} - \left(\sum_{i=1}^{I} x_{i,t}^1 + \sum_{i=1}^{I} x_{i,t}^2\right) + R_t - S_t - E_t - D_t + WI_t - WO_t,$$

wherein, $V_t$ and $V_{t-1}$ represent a storage capacity at the $t^{th}$ time segment and a storage capacity at a $t-1^{th}$ time segment of the reservoir, respectively; $S_t$ represents an amount of water leaked from the reservoir at the $t^{th}$ time segment; $E_t$ represents an amount of water evaporated from the reservoir at the $t^{th}$ time segment; $R_t$ represents an amount of water flowing into the reservoir at the $t^{th}$ time segment; $D_t$ represents a water supply of the reservoir for another industry at the $t^{th}$ time segment; $WI_t$ represents an amount of water diverted from another basin at the $t^{th}$ time segment; and $WO_t$ represents an amount of water diverted to another basin at the $t^{th}$ time segment;
the constraint on the hydrologic budget of the river when the controlled reservoir does not exist is:

$$RD_t = \left(\sum_{i=1}^{I} x_{i,t}^1 + \sum_{i=1}^{I} x_{i,t}^2\right) + RXH_t,$$

wherein, $RD_t$ represents an amount of water usable in the river for the agricultural irrigation at the $t^{th}$ time segment; and $RXH_t$ represents an amount of water unusable by the river at the $t^{th}$ time segment;

the water demand constraint comprises a water demand constraint for the contracted farmland and a water demand constraint for the non-contracted farmland;
the water demand constraint for the contracted farmland is:

$$\eta_t x_{i,t}^1 \leq ET_{i,t}^1 - 1000 A_i^1 P_{i,t}^1$$

the water demand constraint for the non-contracted farmland is:

$$\eta_t x_{i,t}^2 \leq ET_{i,t}^2 - 1000 A_i^2 P_{i,t}^2$$

wherein, $A_{i,t}^1$ and $A_{i,t}^2$ represent an area of the contracted farmland and an area of the non-contracted farmland of the $i^{th}$ water user, respectively; $P_{i,t}^1$ and $P_{i,t}^2$ represent a valid rainfall of the contracted farmland and a valid rainfall of the non-contracted farmland of the $i^{th}$ water user at the $t^{th}$ time segment, respectively;
the reservoir constraint is:

$$V\mathrm{Min}_t \leq V_t \leq V\mathrm{Max}_t,$$

wherein, $V\mathrm{Max}_t$ and $V\mathrm{Min}_t$ represent a maximum capacity and a minimum storage capacity of the reservoir at a $t^{th}$ time point, respectively;
the constraint on the water carrying capacity of the canal is:

$$\sum_{i=1}^{I_j} (x_{i,t}^1 + x_{i,t}^2) \leq QMax_{j,t},$$

wherein, $QMax_{j,t}$ represents a maximum water carrying capacity of a $j^{th}$ canal at the $t^{th}$ time segment; and $I_j$ represents a water user, wherein the $j^{th}$ canal provides water for the water user;
the constraint on the minimum surface water supply for the township is:

$$x_{i,t}^1 \geq M_{i,t},$$

wherein, $M_{i,t}$ represents a minimum surface water supply for the contracted farmland of the $i^{th}$ water user at the $t^{th}$ time segment; and
the constraint on the water diversion and use of another basin is:

$$\sum_{i=1}^{K} (x_{i,t}^1 + x_{i,t}^2) \leq RLoc_t,$$

wherein, K represents a quantity of water user associations, of a water diversion point; and $RLoc_t$ represents a self-produced runoff of a basin or the amount of water usable in the river for the agricultural irrigation at the $t^{th}$ time segment.

* * * * *